Oct. 6, 1925.
J. H. BECKER
1,556,198
GREASE INJECTOR
Filed Nov. 24, 1924
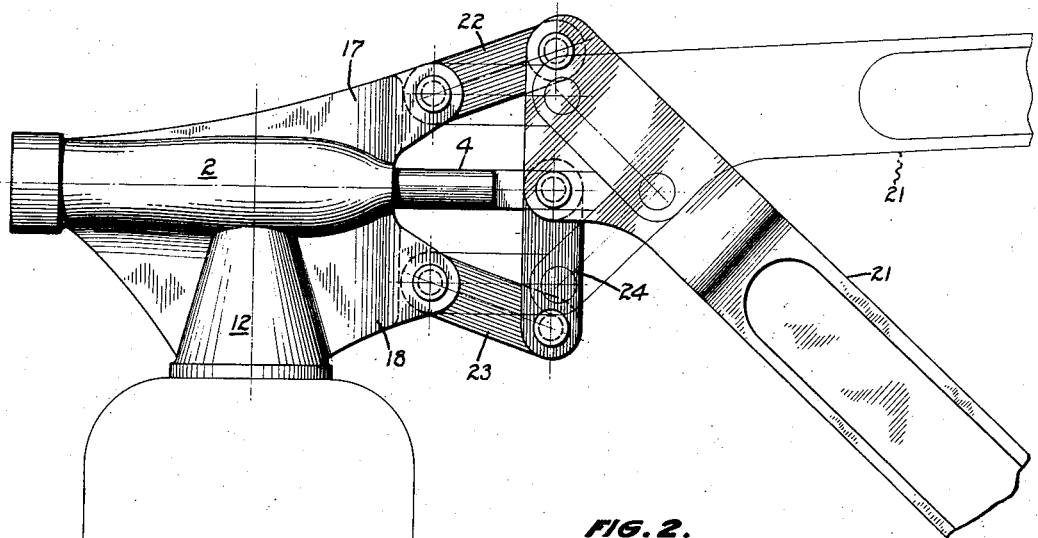
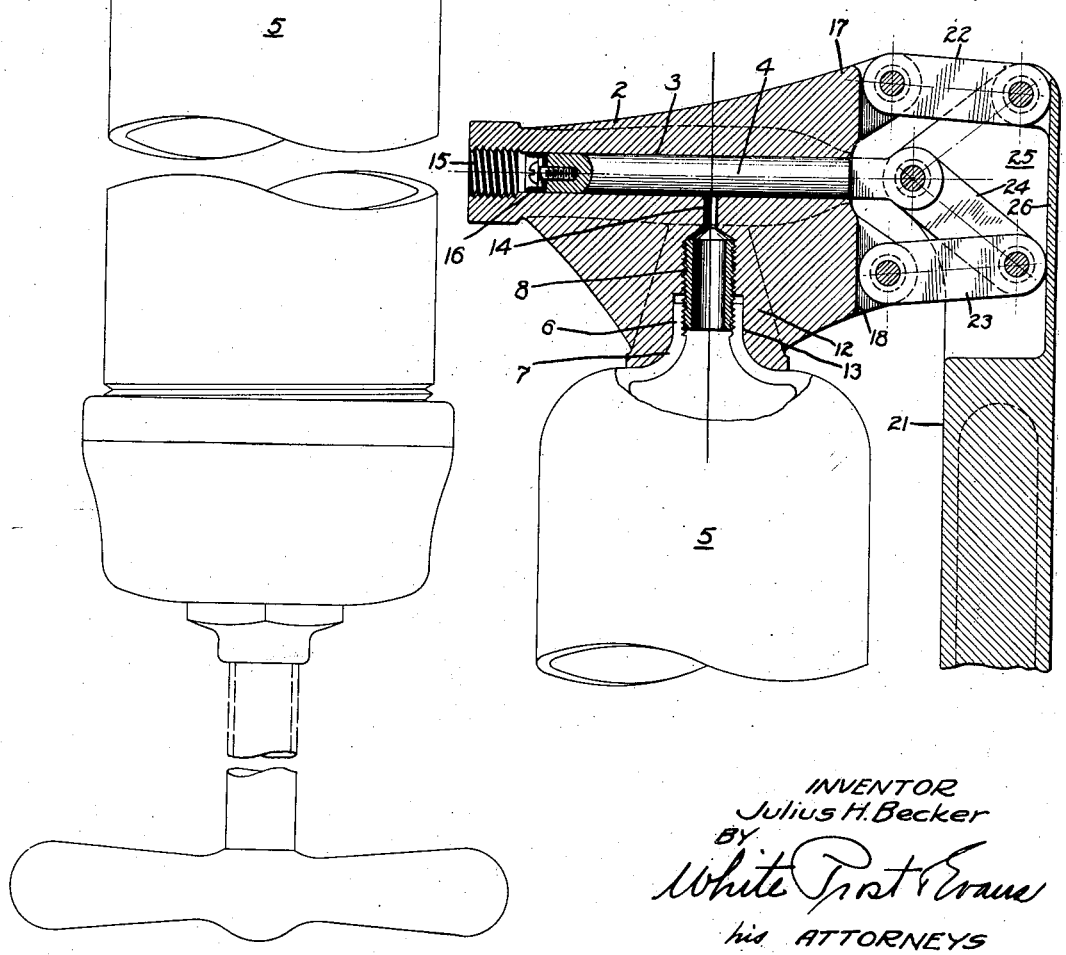
INVENTOR
Julius H. Becker
BY
White Prost & Evans
his ATTORNEYS Patented Oct. 6, 1925.

1,556,198

UNITED STATES PATENT OFFICE.

JULIUS H. BECKER, OF SAN FRANCISCO, CALIFORNIA, ASSIGNOR TO GOODMAN BROS., A COPARTNERSHIP CONSISTING OF SYDNEY M. GOODMAN, LOUIS GOODMAN, AND SAMUEL GOODMAN, OF SAN FRANCISCO, CALIFORNIA.

GREASE INJECTOR.

Application filed November 24, 1924. Serial No. 751,829.

*To all whom it may concern:*

Be it known that I, JULIUS H. BECKER, a citizen of the United States, and a resident of the city and county of San Francisco, State of California, have invented a certain new and useful Grease Injector, of which the following is a specification.

The invention relates to a device for injecting grease and other lubricants into bearings under a very high pressure.

An object of the invention is to provide a grease injector which may be attached to a grease gun, to inject the grease discharged thereinto from the gun, into the bearing at a very high pressure.

Another object of the invention is to provide a grease injector which may be attached to the grease gun in such manner that the force applied to eject the grease from the injector will not rupture the connection between the injector and the gun.

Another object of the invention is to provide a grease injector having an operating lever, for moving the plunger for ejecting the grease with means for causing the force applied by the lever to be exerted longitudinally in the direction of the axis of the plunger, regardless of the angular position of the operating lever.

The invention possesses other advantageous features, some of which with the foregoing, will be set forth at length in the following description, where I shall outline in full that form of my invention which I have selected for illustration in the drawings accompanying and forming part of the present specification. In said drawings I have shown one form of grease injector embodying my invention, but it is to be understood that I do not limit myself to such form, since the invention as set forth in the claim may be embodied in a plurality of forms.

Referring to said drawings:

Figure 1 is a side elevation of the injector of my invention mounted on a grease gun, a portion of the operating lever and a portion of the grease gun being broken away to reduce the size of the figure.

Figure 2 is a longitudinal section through the injector of my invention attached to a grease gun, the plunger being at the end of its ejection stroke.

It has been found that the pressures developed in grease guns are not sufficient to force heavy grease into all parts of the bearing to be lubricated and, in order to increase this pressure, I have provided an auxiliary injector or pump which is adapted to be connected to and receive grease from the grease gun and to discharge the grease at a very high pressure so that the grease is introduced into all parts of the bearing. Grease guns as now manufactured are provided with a discharge nipple which is not constructed to withstand transverse pressure, so that when a grease ejector is attached to the gun, the force applied in ejecting the grease from the ejector produces a strain at the nipple which would result in the rupture of the nipple unless some means are provided for taking the strain. In accordance with my invention, I provide a socket in the injector, into which the end of the grease gun fits snugly, so that the force applied is transferred to the end of the grease gun, rather than to the nipple. I have also provided means for transmitting the force of the lever to the plunger in the injector so that the force is always in the line of the longitudinal axis of the plunger, thereby preventing bending of the plunger due to the application of a large force to the operating lever.

The injector of my invention comprises a body 2 formed of metal and having a cylindrical bore 3 therein into which the grease is introduced from the grease gun when the plunger 4 in the bore is in its retracted position. The grease gun 5 is provided at its end with a neck 6 which is spun or pressed from the body of the gun, so that the neck joins the gun in a smooth curve 7. Screwed into the neck 6 is a nipple 8 through which grease discharges from the gun and the ejector is screwed to that portion of the nipple which projects from the neck. The body 2 of the injector is provided with an extension 12 projecting laterally from the body, and the extension 12 is provided with a socket 13 having a screw-threaded bore at its upper portion adapted to engage the nipple 8 and having its lower portion flared outwardly to conform to the curved portion 7 of the neck 6. When the injector is screwed onto the gun 5, the wall of the socket forms a tight joint with the side wall of the neck and with the curved wall 7 connecting the neck with the body portion and with the upper portion of the body of the gun immediately surrounding the neck. This provides a firm footing for the injector and causes the strain applied to the injector to eject the grease therefrom to be transferred to the neck and body of the gun, so that the nipple 8 is not subjected to deleterious strain. At its upper portion, the socket 13 is provided with a small passage 14 opening into the side of the bore 3, to permit the grease ejected from the gun to enter the bore 3. At its discharge end, the bore 3 is provided with a threaded portion 15 to receive a conduit through which the grease is forced to the bearing.

The plunger 4 preferably forms a snug fit in the bore 3 and, in order to minimize the leakage of grease backward between the plunger and the face of the bore, the plunger is provided at its forward end with a cup-leather 16. The rear end of the plunger extends from the body 2 and means are provided for applying force to the plunger in the direction of its longitudinal axis.

Formed on the body 2 and integral therewith are two ears 17 and 18, disposed above and below the plunger respectively. The plunger is actuated by a lever 21 pivoted intermediate its ends to the projected end of the plunger 4. Above the point of pivotal connection of the plunger 4, the lever is connected to the ear 17 by the link 22, the ear 18 is connected to the end of the plunger 4 by the links 23 and 24. These links are connected together at their ends remote from the ear 18 and the plunger 4 respectively. The end of the lever is provided with a pocket 25 into which the links 23 and 24 move as the lever is actuated to eject grease from the bore 3. The ejecting movement of the plunger is limited by the contact of the connected ends of the links 23 and 24 with the rear wall 26 of the pocket.

That portion of the lever lying between its point of pivotal connection with the link 22 and its point of pivotal connection with the end of the plunger 4, constitutes in effect a link, of which the lever 21 is an extension, so that the end of the plunger 4 is connected to the two ears 17 and 18 by two toggle levers, these levers serving to cause the force applied by the lever 21 to be always exerted in the direction of the longitudinal axis of the plunger 4, so that no transverse or bending strain may be applied to the plunger 4. Due to the means of connecting the lever with the plunger 4, the lever may be moved through an angle of 90 degrees from position of full retraction of the plunger to the position of full ejection and this long arc of movement of the lever permits the application of a large force to the plunger. Regardless of the position of the lever, the force applied to the plunger is always in the direction of its longitudinal axis. In Figure 1 I have shown in dotted lines the position of the lever when the plunger is in the position of full retraction and in Figure 2 I have shown the position of the lever when the plunger is in the position of full ejection.

I claim:

A grease injector adapted to be attached to and receive grease from a grease gun, comprising a body having a cylindrical bore into which the grease is forced by the grease gun, a plunger movable in said bore, ears on said body above and below the plunger, a lever having a pocket therein at its upper end, said lever being pivoted to the end of the plunger, a link connecting the lever above said pivot with the upper ear, a second link connected to the lower ear and a third link connecting the free end of the second link with the end of the plunger, said second and third links being disposed in said pocket when the plunger is at the end of its ejection stroke, the ejection stroke of the plunger being limited by contact of the connected ends of the second and third links with the back wall of the pocket.

In testimony whereof, I have hereunto set my hand.

JULIUS H. BECKER.